United States Patent [19]

Johnson

[11] Patent Number: 4,753,412
[45] Date of Patent: Jun. 28, 1988

[54] TAXIDERMY MANNIKIN MOLD FOR LOCATING EYEPIECES IN CORRECT POSITION

[75] Inventor: Brian Johnson, Spring Green, Wis.

[73] Assignee: American Institute of Taxidermy, Inc., Janesville, Wis.

[21] Appl. No.: 18,584

[22] Filed: Feb. 24, 1987

[51] Int. Cl.4 .............................................. B29C 67/18
[52] U.S. Cl. ........................................ 249/55; 249/91; 249/96; 264/278; 425/2
[58] Field of Search .............................. 249/55, 91, 96; 264/278, 275, 277; 434/295, 296; 425/2; 156/245

[56] References Cited

U.S. PATENT DOCUMENTS

| | | | |
|---|---|---|---|
| 974,024 | 10/1910 | Carter | 249/91 |
| 1,704,829 | 3/1929 | Grubman | 249/55 |
| 2,763,031 | 9/1956 | Rekettye | 264/278 |
| 3,101,993 | 8/1963 | Cohn | 264/278 |
| 3,106,040 | 10/1963 | Ostrander | 264/278 |
| 3,124,842 | 3/1964 | Moormann | 249/55 |
| 3,160,691 | 12/1964 | Chupa | 249/96 |
| 3,889,918 | 6/1975 | Stoeberl | 249/96 |
| 4,157,805 | 6/1979 | Haber et al. | 249/91 |
| 4,432,919 | 2/1984 | Rinehart | 264/46.4 |
| 4,477,500 | 10/1984 | Powell | 434/296 |
| 4,511,522 | 4/1985 | Rinehart | 264/46.4 |
| 4,515,340 | 5/1985 | Rinehart | 264/46.4 |
| 4,596,683 | 6/1986 | Powell | 264/46.4 |
| 4,650,149 | 3/1987 | Poulette et al. | 249/96 |

FOREIGN PATENT DOCUMENTS 912516  3/1982  U.S.S.R. .............................. 249/91

*Primary Examiner*—Ian H. Silbaugh
*Assistant Examiner*—Jill L. Fortenberry
*Attorney, Agent, or Firm*—Isaksen, Lathrop, Esch, Hart & Clark

[57] ABSTRACT

A mold and molding method for forming a taxidermy animal head mannikin with artificial eyepieces molded therein in proper position includes a pair of mold cavity half parts each of the half parts having a cavity surface contoured for correct anatomical formation of the features of half of the mannikin, an eye socket recess in the cavity surface shaped for snugly receiving the front portion of the artificial eyepiece and leaving the rear portion projecting into the mold cavity, and a small keyway selectively located in the eye socket recess to receive a matcing key which is affixed to the front portion of the artificial eyepiece and is positioned thereon so that placement of the key in the keyway locates the eyepiece in proper anatomical position prior to the introduction on liquid foamable hardening material into the cavity between the mold half parts.

5 Claims, 3 Drawing Sheets

TAXIDERMY MANNIKIN MOLD FOR LOCATING EYEPIECES IN CORRECT POSITION

BACKGROUND OF THE INVENTION

1. Field of the Invention

This invention pertains generally to the field of taxidermy mannikin molds, and particularly to mannikin molds having artificial eyepieces attached thereto.

2. Description of the Prior Art

Taxidermists mount animal head skins over molded animal head mannikins, such as deer head mannikins, and secure the result to a wall plaque or the like for use as a trophy. A mold and molding method for producing taxidermy animl head mannikins with the eyes and the eye-surrounding anatomy as part of the mannikin when it comes out of the mold, so that the taxidermist need not spend time and skill positioning or mounting the eyes, or filling in and contouring around the eyes to provide correct anatomical eye-surrounding features, is disclosed in U.S. Pat. Nos. 4,432,919, 4,511,522 and 4,515,340 to Rinehart, the disclosures of which are hereby incorporated by reference. The mannikin mold disclosed in these patents includes reference indicia in the cavity surface of themoldsnear the edge of the eye socket recess which couldbe used to align and indicate correct position of the artificial eyepiece to be inserted in the eye socket recess. The U.S. Pat. No. 4,596,683 to Powell discloses eyepieces having a circular flange with two notches which mate with two diametrically opposed lugs on edges of the eye socket recess to lock the eyepiece into position.

SUMMARY OF THE INVENTION

The taxidermy mannikin mold in accordance with the present invention includes a pair of mold cavity half parts each having a cavity surface contoured for correct anatomical formation of the features of half of the mannikin, an eye socket recess in the cavity surface shaped for snugly receiving the front portion of the artifical eyepiece and leaving the rear portion projecting into the mold cavity, and a small keyway selectively located in the eye socket recess to receive a mating key which is affixed to the front portion of the eyepiece and is positioned thereon so that placement of the key in the keyway locates the eyepiece in proper anatomical position prior to introduction of liquid foamable material into the cavity between the mold half parts. Orienting and inserting the front portion of an eyepiece into each eye socket recess of the mold so that the mating key is properly seated within the keyway in the socket reces ensures that the eyepiece will be located properly, and the pupil oriented correctly in the taxidermy mannikin, whether the pupil is round or elongated. The taxidermy mannikin mold of the present invention automatically positions conventional eyepieces, modified only by addition of the mating key, in correct orientation within the eye socket recess of the mannikin mold.

A taxidermy animal head mannikin having artifical eyepieces which are properly positioned therein may be made with the mannikin mold in accordance with the molding method of the present invention by affixing a mating key to the front portion of each eyepiece and positioning it thereon so that placement of the key in the keyway locates the eyepiece in proper anatomical position. The front portion of an eyepiece must then be oriented and inserted into each eye socket recess of the mold so that the mating key is properly seated within the keyway in the socket recess, leaving the rear portion of the eyepiece projecting into the mold cavity. The half parts of the mold may then be closed together to form the full mold cavity therebetween. Liquid foamable hardenable material may then be introduced into the mold cavity to foam, expand and harden, thereby forming the mannikin with the eyepieces held in proper position therein.

Further objects, features, and advantages of the invention will be apparent from the following detailed description taken in conjunction with the accompanying drawings.

DESCRIPTION OF THE PREFERRED EMBODIMENT

Figure 1:
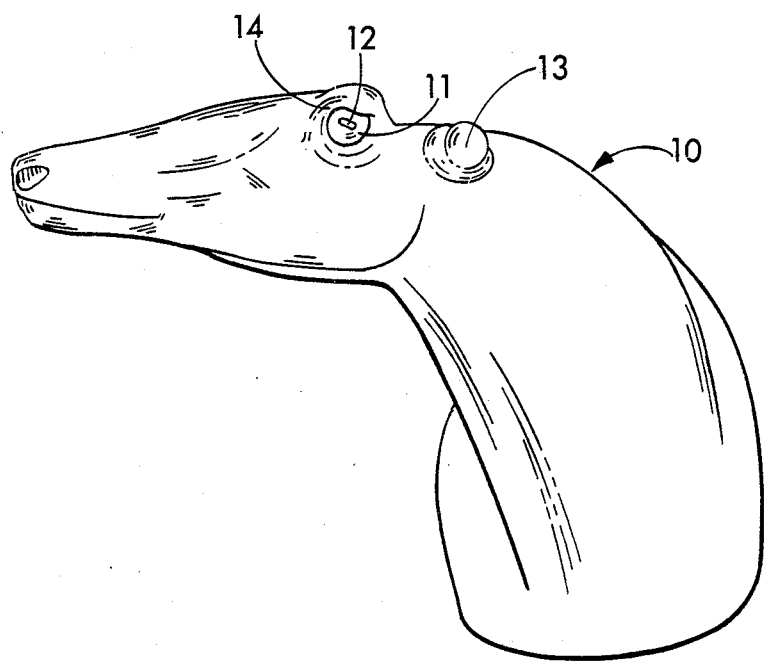
FIG. 1 is a view of a mannikin made in accordance with the present invention.

Referring to the drawings, FIG. 1 shows a deer head mannikin 10 molded in accordance with this invention with light-weight polyurethane from material, the mannikin having insert-molded therein an artifical eyepiece 11 with an elongated pupil 12. The mannikin 10 has correct deer head anatomical features including the ear stump indicated at 13 and the eye-surrounding features indicated at 14.

Figure 2:
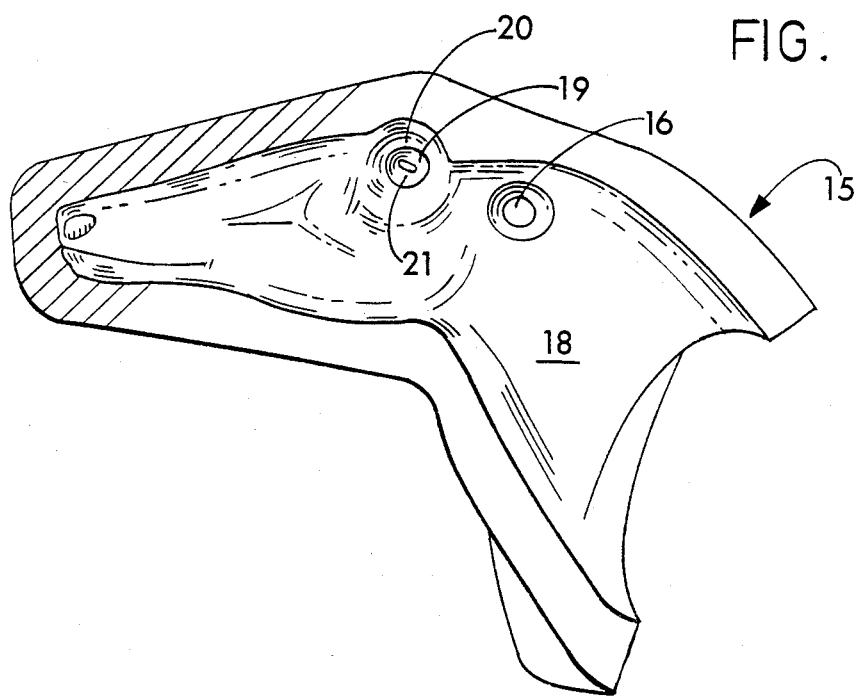
FIG. 2 is a view of the inside of one of the half parts of a mold made in accordance with the present invention.

FIG. 2 shows the right side half part 15 of a mold for forming the mannikin 10, the part 15 having an ear stump recess 16 and an eye socket recess 19 in the cavity surface 18 thereof. The cavity surface 18 is contoured to correctly form all features of the mannikin including the features immediately surrounding the eye, and accordingly, the cavity surface is so contoured as indicated at 20 in FIG. 2 to provide the correct features indicated at 14 in FIG. 1. A small elongated keyway 21 is selectively located in the eyesocket recess 19.

Figure 3:
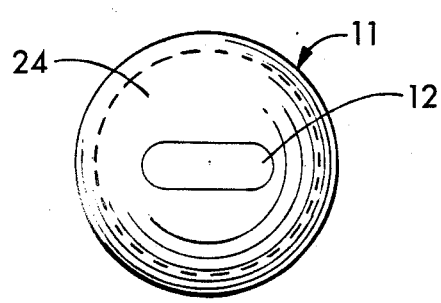
FIG. 3 is a front elevation view of an artifical eyepiece with an elongated pupil, the eyepiece being used in carrying out the invention.
Figure 7:
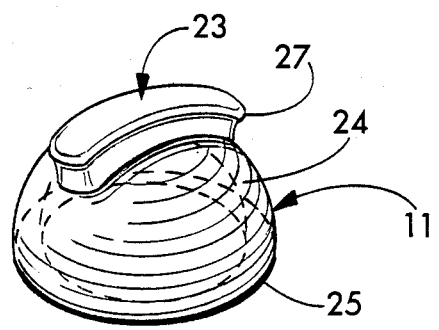
FIG. 7 is a perspective view of the artificial eyepiece of FIG. 3 with an elongated mating key affixed thereto.
Figure 4:
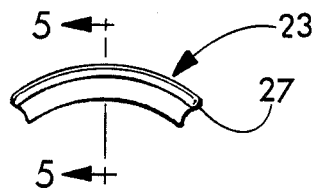
FIG. 4 is a side elevation view of an elongated mating key used in carrying out the present invention.
Figure 5:
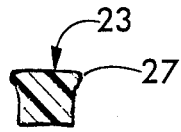
FIG. 5 is a cross-sectional view taken along section line 5—5 of FIG. 4.
Figure 6:
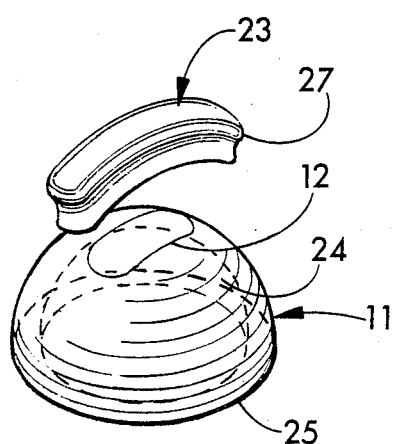
FIG. 6 is a perspective view of the eyepiece of FIG. 3 and the elongated mating key of FIG. 4 projected away from the eyepiece.

FIG. 3 shows an artifical deer eyepiece 11 having an elongated pupil 12. The eyepiece 11 is made with glass or plastic and is a semi-spherical shell having its concavity in the rear side 25 thereof. FIGS. 4 and 5 show an elongated mating key 23 which is to be affixed to the front portion 24 of the artificial eyepiece 11. FIG. 6 shows the elongated mating key 23 and the eyepiece 11 with the mating key 23 projected above the eyepiece 11 in proper orientation before its attachment to the eyepiece 11. FIG. 7 shows the elongated mating key 23 affixed to the eyepiece 11 over the elongated pupil 12 so that a long axis of the key 23 is aligned with the long axis of the pupil. The mating key 23 should be affixed to the front portion of the eyepiece 11 with a removable (cleanable) adhesive which will hold the eye correctly during the molding operation, and will be removable (cleanable) from the front of the eye after the molding operation.

Figure 8:
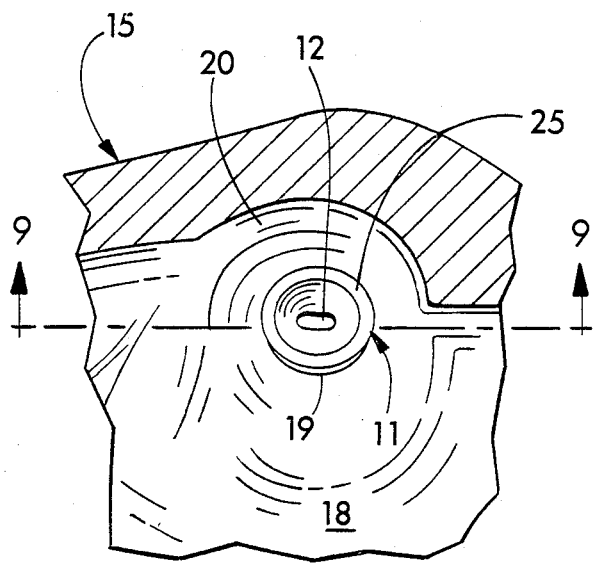
FIG. 8 is an enlarged view of a portion of the mold shown in FIG. 2, but showing the artifical eyepiece inserted therein in proper position.
Figure 9:
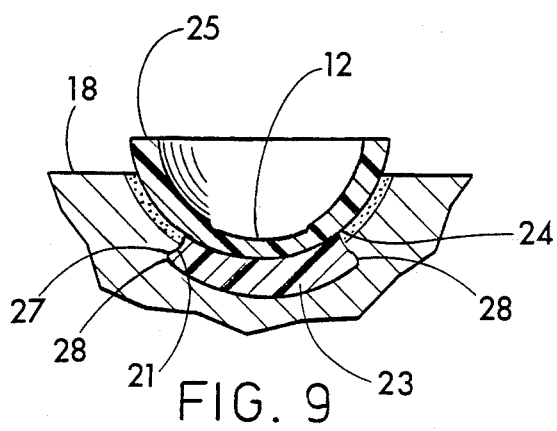
FIG. 9 is a section view taken along section line 9—9 of FIG. 8.

Once the mating key 23 is properly affixed to the front portion 24 of the eyepiece 11, the eyepiece 11 may be inserted into the eye socket recess 19 as shown in FIGS. 8 and 9. The eyepiece 11 should be inserted into the eye socket recess 19 in such a manner that the elongated mating key 23 seats within the elongated kay way 21. To do this, the eyepiece 11 must rotationally oriented so that the long axis of the mating key 23 is aligned with the long axis of the keyway 21. When the eyepiece 11 is inserted properly, the elongated pupil 12 will be properly aligned anatomically and the eyepiece 11 will be correctly located in relationship with the other features of the mold. When inserting the eyepiece 11 into the eye socket recess 19, it is preferable that a cleanable adhesive be placed around the mating key 23 on the front portion 24 of eyepiece so that when the eyepiece 11 is inserted, the cleanable adhesive between the socket recess 19 and the front portion 24 of the eyepiece 11 will hold the eye correctly during the molding operation, leaving the rear portion 25 of the eyepiece 11projecting into the mold cavity. After the molding operation, the cleanable adhesive is removed from the front portion 24 of the eyepiece 11. It is preferable that the mating key 23 be resilient and have a lip 27 near the front thereof, and that the key 21 have a widened portion 28 as shown in FIG. 9. The lip 27 and widened portion 28 together act to retain the key 23 in the keyway 21 once the eyepiece 11 has been inserted into the socket recess 19. Prior to and also during the molding operation the retention of the key 23 in the keyway 21 serves to hold the eyepiece 11 in proper anatomical position and rotational orientation. After the polyurethane foam material has foamed and hardened and the two half parts of the mold are separated from the formed mannikin 10, the lip 27 and widened portion 28 may still cause the mating key 23 to remain within the keyway 21. Separating the two half parts of the mold from the formed mannikin 10 in such a case will serve to also remove the mating key 23 from the front portion 24 of the eyepiece 11, since the mating key 23 was held thereon by a removable (cleanable) adhesive.

It should be appreciated that the invention is carried out by providing a mold comprising half parts which together define a cavity surface contoured for correct anatomical formation of the features of the mannikin, two eye socket recesses in the cavity surface for snugly receiving the front portion of the eyes, and a small keyway in each recess shaped to snugly receive a mating key. Using a removable (cleanable) adhesive, the mating key is simply affixed to a front portion of each eyepiece and positioned thereon so that placement of the key in the keyway locates the eyepiece in proper anatomical position. Additional cleanable adhesive should be placed around the mating key on the front portion of the eyepiece to hold the eyepiece properly during the molding operation. The front portion of an eyepiece should be properly oriented and inserted to each eye socket recess of the mold so that the mating key is properly seated within the keyway in the socket recess, leaving the rear portion of the eyepiece projecting into the mold cavity. After the two half parts of the mold are closed together to form the full mold cavity therebetween, liquid foamable, hardenable material should be introduced into the mold cavity to foam, expand, and harden, thereby forming the mannikin with the eyepieces held in proper position. If the pupil of each eyepiece is elongated, each keyway and each mating key should also be elongated. The mating key should be affixed to each eyepiece so that the long axis of the key is aligned with the long axis of the pupil. Before inserting the front portion of the eyepiece into an eye socket recess, the eyepiece should be rotated so that the long axis of the elongated mating key 23 is aligned with the long axis of the elongated keyway 21. After the mannikin 10 has formed and hardened, the two half parts of the mold may be separated from the mannikin The adhesive may then be cleaned from the eyepieces embedded in the mannikin.

Figure 10:
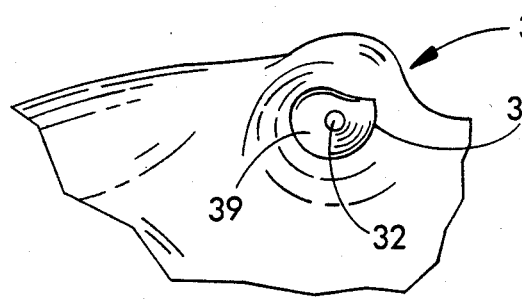
FIG. 10 is an enlarged view of a portion of a mannikin similar to that shown in FIG. 1, but showing an artificial eyepiece with circular pupil located in proper position within the mannikin.
Figure 11:
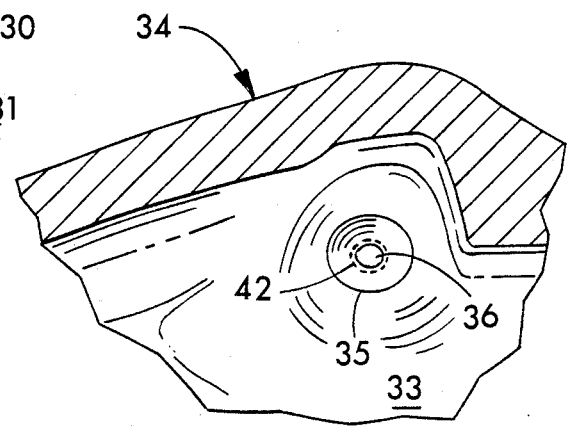
FIG. 11 is an enlarged view of a portion of a mold similar to that shown in FIG. 2, but showing a circular keyway within the eye socket recess of the mannikin mold.
Figure 12:
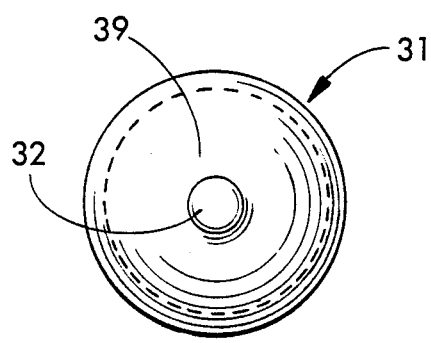
FIG. 12 is a front elevation view of an artificial eyepiece with circular pupil, used in carrying out the present invention.
Figure 13:
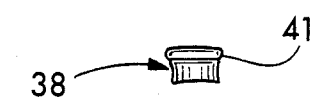
FIG. 13 is a perspective view of a mating key which has a circular cross-section.
Figure 14:
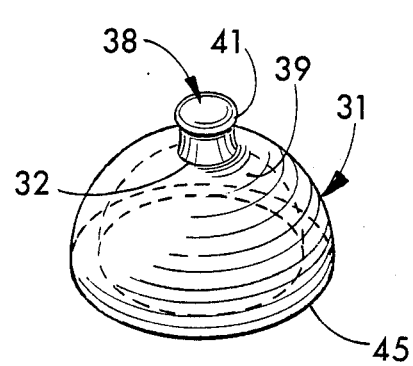
FIG. 14 is a perspective view of the mating key shown in FIG. 13 affixed to the artificial eyepiece of FIG. 12.

As shown in FIG. 10, some mannikins 30 have eyepieces 31 with rounded or circular pupils 32. An eyepiece 31 having a rounded or circular pupil 32 is shown in FIG. 12. Since the eyepiece 31 has a rounded pupil 32, the rotational orientation of the eyepiece 31 is not important. Nevertheless, the eyepiece 31 needs to be positioned properly in the mannikin 30 in relationship with the other features of the mannikin 30. As shown in FIG. 11, the right side half-part 34 of the mold can have a cavity surface 33 including an eye socket recess 35 with circular or round keyway 36 therein. In such a case, the mating key 38 could be circlar in cross-section as shown in FIG. 13. This circular mating key 38 would be affixed to the front portion 39 of the eyepiece 31 over the pupil 32 as shown in FIG. 14. Again, it is preferable that a removable (cleanable) adhesive be used. Furthermore, it is preferable that the circular mating key 38 have a lip 41 and that the rounded keyway 36 have a widened portion 42 to receive the lip 41 of the circular mating key 38 when it is inserted into the round keyway 36.

Figure 15:
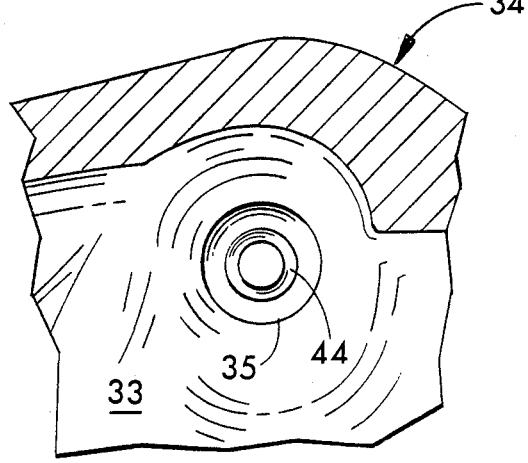
FIG. 15 is an enlarged view of a portion of a mold similar to that shown in FIG. 2, but showing a keyway located within the eye socket recess which is shaped to receive an annular mating keyway.
Figure 16:
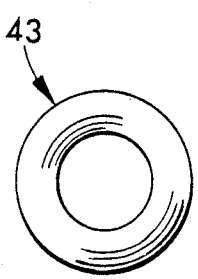
FIG. 16 is a plan view of an annular mating key used to carrying out the present invention.
Figure 17:
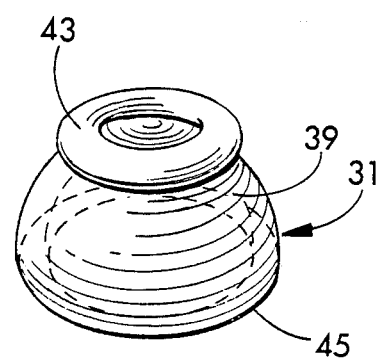
FIG. 17 is a perspective view of the annular mating key shown in FIG. 16 affixed to the eyepiece shown in FIG. 12.

When the eyepiece 31 has a rounded or circular pupil as shown in FIG. 12, an annular mating key as shown at 43 in FIG. 16–17 may be used instead of the mating key 38 shown in FIG. 13. In such a case, the keyway 44 must be shaped so as to receive the annular mating key 43 as shown in FIG. 15 at 44. As shown in FIG. 17, the annular mating key 43 conforms nicely to the rounded surface of the eyepiece 31. For the purposes of this application, an annular mating key 43 is also considered to be circular in cross-section.

Once the mating key is properly affixed to the front portion of the eyepiece and the keyway is properly located within the eye socket recess, it would be difficult to insert the eyepiece into an eye socket recess improperly. Once the mating key seats into the keyway, the mating key will hold the eyepiece in proper anatomical position, and if the eyepiece has an elongated pupil, the mating key will also hold the eyepiece in correct rotational orientation.

It is understood that the invention is not confined to the particular construction and arrangements herein illustrated and described but embraces such modified forms thereof as come within the scope of the following claims.

What is claimed is:

1. A mold apparatus for forming a taxidermy animal head mannikin with artificial eyepieces molded therein in proper anatomical position, comprising:
   a pair of mold cavity half parts, each of the half parts having:
   a cavity surface contoured for correct anatomical formation of the features of the half of the mannikin;
   at least one artificial eyepiece;
   an eye socket recess in the cavity surface shaped for snugly receiving the front portion of the artificial eyepiece and leaving the rear portion projecting into the mold cavity; and
   a small keyway selectively located in the eye socket recess to receive a mating key which is affixed to the front portion of the artificial eyepiece using a cleanable glue and is positioned thereon so that placement of the key in the keyway locates the eyepiece in proper anatomical position prior to the introduction of liquid foamable hardenable material into the cavity between the mold half parts.

2. The mold of claim 1 wherein the eyepiece has an elongated pupil and the key is also elongated and is affixed onto the front portion of the eyepiece over the pupil so that a long axis of the key is aligned with the long axis of the pupil; and wherein the keyway is elongated and located within the socket recess such that insertion of the eyepiece in the socket recess, with the mating key seated within the keyway, aligns the pupil and locates the eyepiece properly.

3. The mold of claim 1 wherein the eyepiece has a circular pupil and the mating key is circular in cross-section and is affixed onto the eyepiece over the ;and wherein the keyway is also circular in crosssection and located within the socket recess such that insertion of the eyepiece into the socket recess, with the mating key seated within the keyway, positions the eyepiece correctly.

4. The mold of claim 3 wherein the mating key is annular.

5. The mold of claim 1 wherein each mating key is resilient and includes a lip, and each keyway has a widened portion to receive the lip, the lip and widened portion together acting to retain the key within the keyway, and to separate the key from the eyepiece when the mold half parts are removed from the hardened mannikin.

* * * * *

UNITED STATES PATENT AND TRADEMARK OFFICE
CERTIFICATE OF CORRECTION

PATENT NO. : 4,753,412
DATED : June 28, 1988
INVENTOR(S) : Brian Johnson

It is certified that error appears in the above-identified patent and that said Letters Patent are hereby corrected as shown below:

Col. 1, line 15, "animl" should read --animal--.
Col. 1, line 25, "themoldsnear" should read -- the molds near--.
Col. 1, line 26, "couldbe" should read --could be--.
Col. 1, line 51, "reces" should read --recess--.

Col. 4, line 56, "circlar" should read --circular--.
Col. 6, line 20, after"the"and before";" insert --pupil--.
Col. 6, line 21, "crosssection" should read -- cross-section--.

Signed and Sealed this

Twenty-ninth Day of November, 1988

*Attest:*

DONALD J. QUIGG

*Attesting Officer*     *Commissioner of Patents and Trademarks*